United States Patent
Jeong

(10) Patent No.: US 9,136,975 B2
(45) Date of Patent: Sep. 15, 2015

(54) METHOD FOR TRANSMITTING DATA, DEVICE FOR TRANSMITTING DATA, DEVICE FOR RECEIVING DATA, AND SYSTEM INCLUDING THE DEVICES

(71) Applicant: Hyeong-Seok Jeong, Yongin-si (KR)

(72) Inventor: Hyeong-Seok Jeong, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 180 days.

(21) Appl. No.: 14/024,654

(22) Filed: Sep. 12, 2013

(65) Prior Publication Data

US 2014/0078921 A1    Mar. 20, 2014

(30) Foreign Application Priority Data

Sep. 14, 2012    (KR) ........................ 10-2012-0102246

(51) Int. Cl.
*G01R 31/08* (2006.01)
*H04L 1/00* (2006.01)

(52) U.S. Cl.
CPC .................................. *H04L 1/0003* (2013.01)

(58) Field of Classification Search
CPC ....................................................... H04L 1/003
See application file for complete search history.

(56) References Cited

U.S. PATENT DOCUMENTS

| | | | |
|---|---|---|---|
| 6,810,236 B2 | 10/2004 | Terry et al. | |
| 7,126,996 B2 | 10/2006 | Classon et al. | |
| 7,801,075 B2 | 9/2010 | Lim et al. | |
| 2003/0092461 A1* | 5/2003 | Moulsley et al. | 455/522 |
| 2010/0216472 A1 | 8/2010 | Youn et al. | |
| 2010/0322171 A1 | 12/2010 | Dekorsy et al. | |
| 2011/0222462 A1 | 9/2011 | Ho et al. | |
| 2012/0063405 A1 | 3/2012 | Han et al. | |
| 2014/0078921 A1* | 3/2014 | Jeong | 370/252 |

FOREIGN PATENT DOCUMENTS

| | | |
|---|---|---|
| JP | 2006180374 | 7/2006 |
| JP | 2010259012 | 11/2010 |
| KR | 20090078968 | 7/2009 |

* cited by examiner

*Primary Examiner* — Robert Wilson
(74) *Attorney, Agent, or Firm* — Volentine & Whitt, PLLC

(57) ABSTRACT

A device for transmitting data includes a data receiving unit, a channel quality measurement unit, and a modulating unit. The data receiving unit is configured to receive first transmission data for a first terminal and second transmission data for a second terminal. The channel quality measurement unit is configured to measure a first reception sensitivity of a channel connected to the first terminal and to measure a second reception sensitivity of a channel connected to the second terminal, and a modulating unit configured to determine a modulation scheme based on the first and second reception sensitivities, to encode the first transmission data and the second transmission data according to the determined modulation scheme to obtain modulated data, and to transmit the modulated data to the first and second terminals.

28 Claims, 10 Drawing Sheets

FIG. 5

| SENSITIVITY | MODULATING SCHEME |
|---|---|
| K2≤S | 64QAM |
| K1<S<K2 | 16QAM |
| S≤K1 | QPSK |

METHOD FOR TRANSMITTING DATA, DEVICE FOR TRANSMITTING DATA, DEVICE FOR RECEIVING DATA, AND SYSTEM INCLUDING THE DEVICES

CROSS-REFERENCE TO RELATED APPLICATIONS

A claim of priority is made Korean Patent Application No. 10-2012-0102246, filed on Sep. 14, 2012, in the Korean Intellectual Property Office, the disclosure of which is incorporated herein in its entirety by reference.

BACKGROUND

The present inventive concept relates to a method for transmitting data, a device for transmitting data, a device for receiving data, and a system including devices for transmitting and receiving data.

Research associated with next-generation communication systems has been active in efforts to provide users with various services exhibiting a high communication speeds and a high QoS (Quality of Service). In particular, research has focused on support of high-speed services while assuring mobility and QoS of a BWA (Broadband Wireless Access) communication system, such as a WLAN (Wireless Local Area Network) system and a WMAN (Wireless Metropolitan Area Network) system.

SUMMARY

According to an aspect of the present inventive concept, a device for transmitting data is provided which includes a data receiving unit, a channel quality measurement unit, and a modulating unit. The data receiving unit is configured to receive first transmission data for a first terminal and second transmission data for a second terminal. The channel quality measurement unit is configured to measure a first reception sensitivity of a channel connected to the first terminal and to measure a second reception sensitivity of a channel connected to the second terminal, and a modulating unit configured to determine a modulation scheme based on the first and second reception sensitivities, to encode the first transmission data and the second transmission data according to the determined modulation scheme to obtain modulated data, and to transmit the modulated data to the first and second terminals.

According to another aspect of the present inventive concept, a method for transmitting data is provided which includes measuring a first reception sensitivity of a channel connected to a first terminal from the first terminal, measuring a second reception sensitivity of a channel connected to a second terminal from the second terminal, receiving first and second transmission data to be transmitted to the first and second terminals, determining a modulation scheme based on the first and second reception sensitivities, encoding the first and second transmission data using the determined modulation scheme to obtain modulated data, and transmitting the modulated data to the first and second terminals.

According to another aspect of the present inventive concept, a system for transmitting and receiving data is provided which includes first and second terminals, and a device for transmitting data. The device for transmitting data is configured to receive first transmission data for the first terminal and second transmission data for the second terminal, to determine a modulation scheme based on first and second reception sensitivities of the first and second terminals, respectively, to encode the first transmission data and the second transmission data according to the determined modulation scheme to obtain modulated data, and to transmit the modulated data to the first and second terminals.

BRIEF DESCRIPTION OF THE DRAWINGS

The above and other aspects and features of the present inventive concept will become apparent from the detailed description that follows taken in conjunction with the accompanying drawings, in which:

FIGS. 5 to 11 are diagrams explaining a method for transmitting data according to an embodiment of the present inventive concept;

DETAILED DESCRIPTION OF EMBODIMENTS

Figure 1:
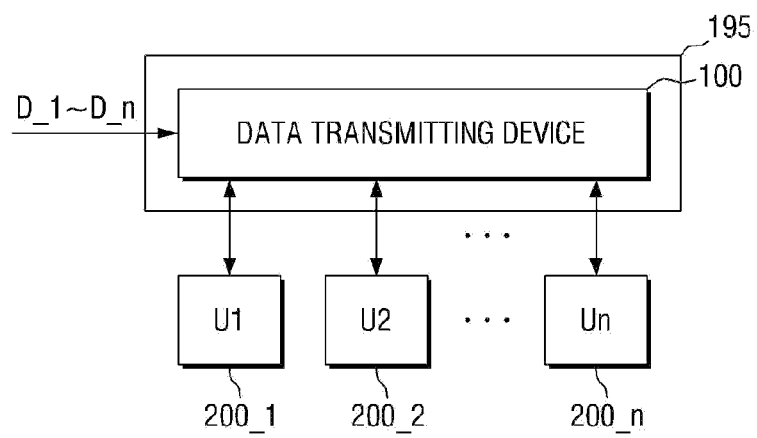
FIG. 1 is a conceptual block diagram of a system for transmitting and receiving data according to an embodiment of the present inventive concept.

Advantages and features of the present inventive concept and methods of accomplishing the same may be understood more readily by reference to the following detailed description of preferred embodiments and the accompanying drawings. The present inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the present inventive concept will only be defined by the appended claims. In the drawings, the thickness of layers and regions are exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

The use of the terms "a" and "an" and "the" and similar referents in the context of describing the inventive concept (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present inventive concept.

Unless defined otherwise, all technical and scientific terms used herein have the same meaning as commonly understood by one of ordinary skill in the art to which this inventive concept belongs. It is noted that the use of any and all examples, or exemplary terms provided herein is intended merely to better illuminate the inventive concept and is not a limitation on the scope of the inventive concept unless otherwise specified. Further, unless defined otherwise, all terms defined in generally used dictionaries may not be overly interpreted.

As is traditional in the field of the present inventive concept, embodiments are at least partially described/depicted herein in terms of functional blocks and/or units and/or modules. Unless otherwise stated, it will be understood that these blocks/units/modules may be physically implemented by hard-wired electronic circuits and/or logic circuits, or by processor driven software, or any by a combination thereof. Non-limiting examples include Field Programmable Gate Array (FPGA) or Application Specific Integrated Circuit (ASIC), which performs certain tasks. The blocks/units/module may be configured to reside on the addressable storage medium and configured to execute responsive to one or more processors. Each block/unit/module may, by way of example, be made up of a combination of components, such as software components, object-oriented software components, class components and task components, processes, functions, attributes, procedures, subroutines, segments of program code, drivers, firmware, microcode, circuitry, data, databases, data structures, tables, arrays, and variables. Also, it will be understood that each of the blocks/units/modules described herein may be physically and/or functionally divided into multiple blocks and/or units without departing from the inventive concept. Conversely, two or more blocks and/or units described herein may be physically and/or functionally combined into a single block and/or unit without departing from the inventive concept.

Hereinafter, preferred embodiments of the present inventive concept will be described in detail with reference to the accompanying drawings.

FIG. 1 is a functional block diagram of a system for transmitting and receiving data according to an embodiment of the present inventive concept.

Referring to FIG. 1, a system 1 for transmitting and receiving data includes a plurality of terminals (U1) 200_1 to (Un) 200_$n$ and a data transmitting device 100.

The data transmitting device 100 may transmit externally received transmission data D_1 to D_n to the plurality of terminals 200_1 to 200_$n$, and receive responses thereto from the plurality of terminals 200_1 to 200_$n$. In particular, the data transmitting device 100 may transmit first transmission data D_1 to the first terminal 200_1 and receive a response thereto, transmit second transmission data D_2 to the second terminal 200_2 and receive a response thereto, and transmit the n-th transmission data D_n to the n-th terminal 200_$n$ and receive a response thereto.

In some example embodiments of the present inventive concept, the terminals 200_1 to 200_$n$ and the data transmitting device 100 communicate with each other over a wireless communication network. For example, reference numeral 195 in FIG. 1 may denote a wireless Base Station (BS), and the data transmitting device 100 may be contained in the BS 195. Also, the data transmitting device 100 may be fabricated in the form of an integrated circuit chip or an integrated circuit card, but the present inventive concept is not limited thereto.

In some example embodiments of the present inventive concept, the wireless communication network over which the terminals 200_1 to 200_$n$ and the data transmitting device 100 communicate is a BWA (Broadband Wireless Access) communication network. The BWA communication network may be a mobile communication network adopting an OFDM (Orthogonal Frequency Division Multiplexing) or OFDMA (Orthogonal Frequency Division Multiple Access) protocol utilizing superimposed frequency spectrums, but the present inventive concept is not limited thereto.

In the case where the communication network of the terminals 200_1 to 200_$n$ and the data transmitting device 100 is a BWA communication network using OFDM or OFDMA, a transfer efficiency of the data transmitting device 100 may be optimized by maintaining orthogonality between a plurality of sub-carriers and by using a guard interval to minimized inter symbol interference (ISI). Generally, optimum transfer efficiency is achieved when data is transmitted at high speed, transmission frequencies are efficiently utilized, and multi-path and frequency selective fading are minimized.

As will be described in more detail below, the system 1 for transmitting and receiving data according to the present embodiment is characterized by favorable transfer efficiencies at relatively high-speed communication.

Hereinafter, with reference to FIGS. 2 and 3, an exemplary configuration of the system 1 for transmitting and receiving data will be described in more detail.

Figure 2:
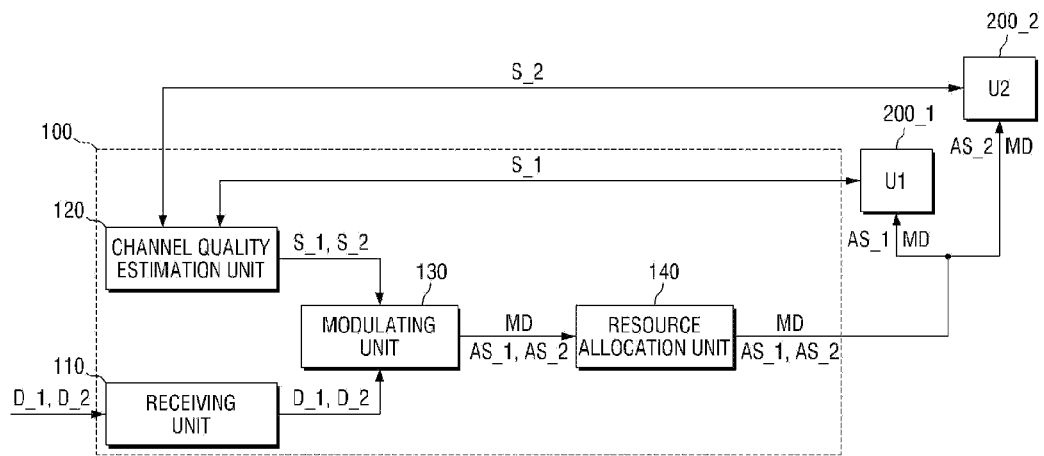
FIG. 2 is a conceptual block diagram of a device for transmitting data according to an embodiment of the present inventive concept.
Figure 3:
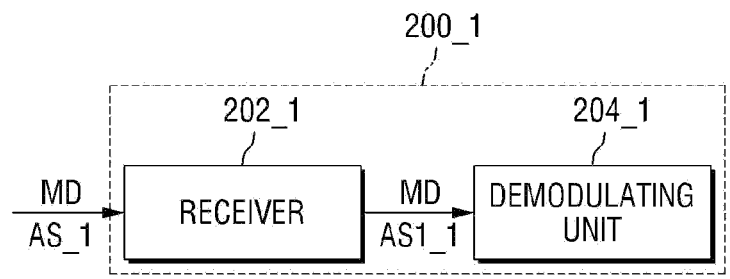
FIG. 3 is a conceptual block diagram of a device for receiving data according to an embodiment of the present inventive concept.

FIG. 2 is a functional block diagram of a device for transmitting data according to an embodiment of the present inventive concept, and FIG. 3 is a functional block diagram of the device for receiving data according to an embodiment of the present inventive concept.

Referring to FIG. 2, the data transmitting device 100 includes a data receiving unit 110, a channel quality measurement unit 120, a modulating unit 130, and a resource allocation unit 140. For convenience of explanation, in the example of FIG. 2, the data transmitting device 100 is shown as communicating with only two terminals, namely, first terminal 200_1 and the second terminal 200_2. However, as suggested by FIG. 1 described above, it will be understood that the inventive concept is not limited by any particular number ("n") of terminals, and the description below is also applicable to the case where there are three or more terminals.

The data receiving unit 110 may receive, from an external source, the first transmission data D_1 to be provided to the first terminal 200_1 and the second transmission data D_2 to be provided to the second terminal 200_2. Here, the first transmission data D_1 is data that the data transmitting device 100 is to transmit to the first terminal 200_1, and the second transmission data D_2 is data that the data transmitting device 100 is to transmit to the second terminal 200_2.

The channel quality measurement unit 120 of this embodiment measures a first reception sensitivity S_1 of a channel connected to the first terminal 200_1, and measures a second reception sensitivity S_2 of a channel connected to the second terminal 200_2.

The channel quality measurement unit 120 may assess any of a variety of different channel characteristics to measure the first reception sensitivity S_1 of the channel connected to the first terminal 200_1 and the second reception sensitivity S_2 of the channel connected to the second terminal 200_2. For example, in the case where the data communication system is an OFDM or OFDMA type mobile communication system, information about the wireless channel state of the mobile terminals 200_1 and 200_2 may be information that is needed to determine an AMC (Adaptive Modulation and Channel Coding) level with respect to the corresponding terminals 200_1 and 200_2.

In the example of this embodiment, the respective terminals 200_1 and 200_2 transmit a CQI (Channel Quality Indicator) for each frame to the data transmitting device 100, and the channel quality estimation unit 120 of the data transmitting device 100 measures the reception sensitivities S_1 and S_2 of the channels connected to the corresponding terminals 200_1 and 200_2 based on the CQI received for each frame from the respective terminals 200_1 and 200_2 in a cell.

The modulating unit 130 of this embodiment determines a modulation scheme utilized to transmit at least a part of the first transmission data D_1 to the first terminal 200_1 and at least a part of the second transmission data D_2 to the second terminal 200_2. The modulation unit 130 makes this determination based on the measured first and second reception sensitivities S_1 and S_2. In addition, the modulation unit 130 generates modulated data MD that is encoded (modulated) according to the determined modulation scheme.

Here, it is noted that one modulated data MD (for example, one data stream or one symbol) is obtained from the encoding of at least a part of the first transmission data D_1 and at least a part of the second transmission data D_2. This in contrast to modulated first transmission data which is separate from modulate second transmission data. As explained below, this one modulated data MD is transmitted to both the first and second terminals 200_1 and 200_2.

Further, the modulating unit 130 may transmit a first analysis scheme AS_1 that enables the modulated data MD to be analyzed as at least a part of the first transmission data D_1 to the first terminal 200_1, and may transmit a second analysis scheme AS_2 that enables the modulated data to be analyzed as at least a part of the second transmission data D_2 to the second terminal 200_2. At this time, at least one of the first and second analysis schemes AS_1 and AS_2 may be a scheme for analyzing the modulated data MD by moving an analysis reference point of an I-Q plane. A more detailed description of the operation of the modulating unit 130 will be presented later with reference to FIGS. 4 to 11.

In some embodiments of the present inventive concept, when the data communication system is an OFDM or OFDMA type mobile communication system, the modulated data MD that is encoded by the modulating unit 130 may mean one data symbol. That is, the modulating unit 130 may determine a modulation scheme that can transmit at least a part of the first transmission data D_1 to the first terminal 200_1 and transmit at least a part of the second transmission data D_2 to the second terminal 200_2 based on the measured first and second reception sensitivities S_1 and S_2, and may transmit the data symbol encoded according to the determined modulation scheme to the first and second terminals 200_1 and 200_2.

The resource allocation unit 140 serves to allocate the modulated data MD generated by the modulation unit 130 to a predetermined time period and a predetermined frequency period.

In the case where the data communication system according to this embodiment is an OFDM or OFDMA type mobile communication system, it is necessary to appropriately distribute resources in order to heighten the channel utilization between a plurality of terminals 200_1 to 200_n which are located in one cell and the data transmitting device 100. Accordingly, data transmission may be performed in the unit of a frame, and each frame may be divided into a downlink period in which downlink data can be transmitted and an uplink period in which uplink data can be transmitted.

The uplink and downlink data periods may be further divided into a frequency axis and a time axis, an each element that is divided in a two-dimensional (2D) arrangement of the frequency axis and the time axis may configure one resource region.

In order for the terminals 200_1 to 200_n to allocate such downlink data, the resource allocation unit 140 may allocate the modulated data MD to the downlink data period by occupying a plurality of resource regions using, for example, a normal mapping (MAP), a new normal MAP, or a Hybrid Automatic-Repeat-Request (H-ARQ) MAP.

The modulated data MD that is allocated to the downlink data period by the resource allocation unit 140 may be transmitted to the respective terminals 200_1 and 200_2. Specifically, the first terminal 200_1 may receive the modulated data MD and the first analysis scheme AS_1, and the second terminal 200_2 may receive the modulated data MD and the second analysis scheme AS_2.

Referring to FIG. 3, each of the terminals 200_1 and 200_2 may include a receiver 202_1 and a reverse modulating (or demodulating) unit 204_1. For convenience in explanation, FIG. 3 illustrates only the constituent elements of the first terminal 200_1. However, the remaining terminals 200_2 to 200_n may be similarly configured.

Referring still to FIG. 3, the receiver 202_1 may receive the modulated data MD and the analysis scheme AS_1 for the modulated data MD. Further, the reverse modulation unit 204_1 may receive the modulated data MD and the analysis scheme AS_1 from the receiver 202_1 and extract n-bit data (here, n is a natural number) from the modulated data MD. The n-bit data may be partial bits of the data D_1 that the data transmitting device 100 intends to transmit to the terminal 200_1, and the analysis scheme AS_1 may be a scheme for analyzing the modulated data MD by moving an analysis reference point of an I-Q plane. Further details of the reverse modulation unit 204_1 will be described later herein.

Hereinafter, referring to FIGS. 2, and 4 to 11, a method for transmitting data according to an embodiment of the present inventive concept will be described.

Figure 4:
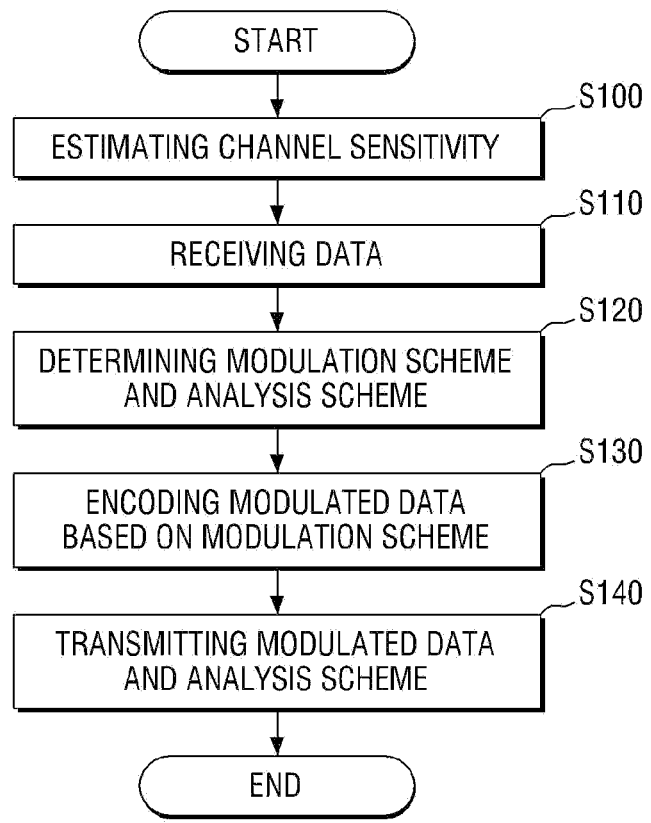
FIG. 4 is a flowchart illustrating a method for transmitting data according to an embodiment of the present inventive concept.

FIG. 4 is a flowchart illustrating a method for transmitting data according to an embodiment of the present inventive concept. FIGS. 5 to 11 are various diagrams that will be referenced in explaining a method for transmitting data according to an embodiment of the present inventive concept.

First, referring to FIG. 4, the channel sensitivity is measured (S100). In the example of this embodiment, the channel quality measurement unit 120 may provide a request for the CQI (Channel Quality Indicator) for each frame to the respective terminals 200_1 and 200_2, and in response to this, the respective terminals 200_1 and 200_2 may provide the CQI of the channel, to which the terminals belong, to the channel quality measurement unit 120. This information about the wireless channel state of the terminals 200_1 and 200_2 may be information that is utilized to determine an appropriate modulation and an AMC (Adaptive Modulation and Channel Coding) level with respect to the corresponding terminals 200_1 and 200_2.

Referring again to FIG. 4, the transmission data is received (S110). Specifically, the data receiving unit 110 receives the first transmission data D_1 and the second transmission data to be transmitted to the first terminal 200_1 and the second terminal 200_2. As a specific example, for convenience in explanation, it is assumed in the explanation that follows that the first transmission data D_1 and the second transmission data D_2 are as shown in FIG. 6.

Next, referring again to FIG. 4, the modulation scheme and the analysis scheme are determined (S120). Specifically, the modulation unit 130 may determine the modulation scheme that can transmit at least a part of the first transmission data D_1 to the first terminal 200_1 and transmit at least a part of the second transmission data D_2 to the second terminal 200_2 based on the measured first and second reception sensitivities S_1 and S_2, and generate the modulated data MD encoded according to the determined modulation scheme.

First, a wireless communication system according to this embodiment may generally follow the modulation scheme as illustrated in FIG. 5. Referring to FIG. 5, if the reception sensitivity S is equal to or lower than the first threshold value K1, the data that is provided to the terminal may be provided, for example, in the QPSK (Quadrature Phase Shift Keying) method, while if the reception sensitivity S is between the first threshold value K1 and the second threshold value K2, the data that is provided to the terminal may be provided, for example, in the 16QAM (Quadrature Amplitude Modulation) method. If the reception sensitivity S is equal to or higher than the second threshold value K2, the data that is provided to the terminal may be provided, for example, in a 64QAM (Quadrature Amplitude Modulation) method.

Here, the first threshold value K1 may be a value that is smaller than the second threshold value K2. That is, if the reception sensitivity S of the channel that is connected to the terminal is not good, the data that is provided to the terminal may be provided in the QPSK method, while if the reception sensitivity S of the channel that is connected to the terminal is good, the data that is provided to the terminal may be provided in the 64QAM method. In other words, if the reception sensitivity S_1 of the first terminal 200_1 is equal to or lower than the first threshold value K1, the data that is provided to the first terminal 200_1 may be provided in the QPSK method, while if the reception sensitivity S_2 of the second terminal 200_2 is equal to or higher than the second threshold value K2, the data that is provided to the second terminal 200_2 may be provided in the 64QAM method. In FIG. 5, it is exemplified that three different modulation methods QPSK, 16QAM, and 64QAM are used depending on the reception sensitivity S. However, the present inventive concept is not limited to such examples, and the modulation method may be changed at any time depending on the reception sensitivity.

Determination of the modulation scheme and the analysis scheme at (S 120) of FIG. 4 will now be described with reference to FIG. 7.

Figure 7:
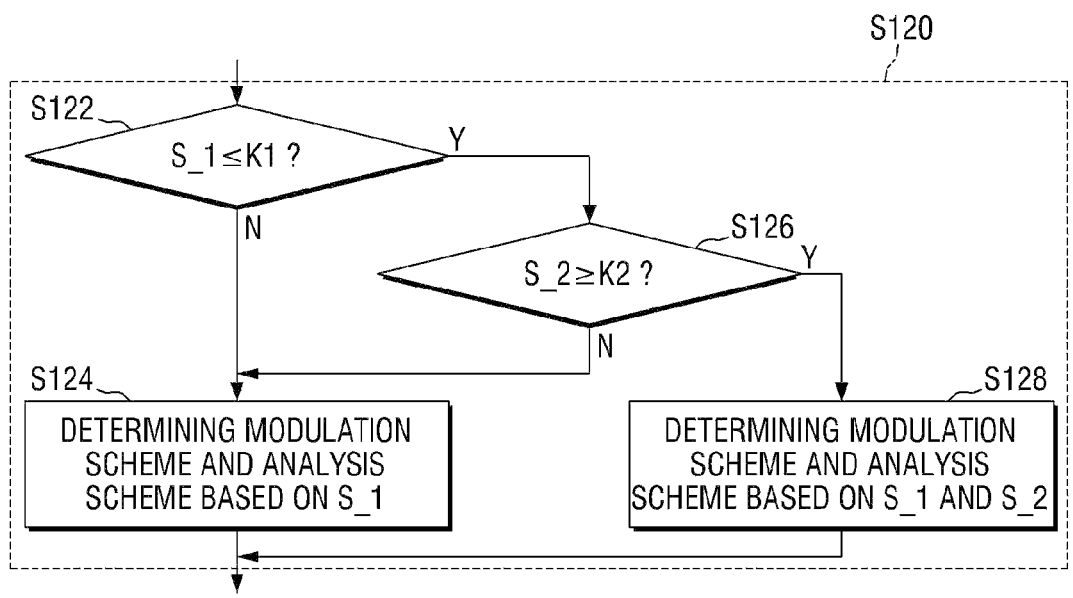
Figure 8:
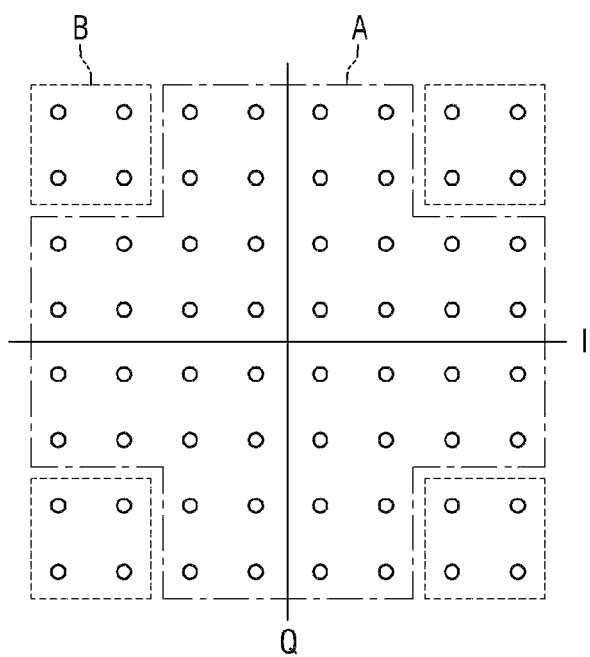

Referring to FIG. 7, in this embodiment, it is first determined whether the first reception sensitivity is equal to or lower than the first threshold value and the second reception sensitivity is equal to or higher than the second threshold value (S122 and S126). If the first reception sensitivity S_1 is higher than the first threshold value K1 or the second reception sensitivity S_2 is lower than the second threshold value K2, the modulation scheme and the analysis scheme, which can transmit a part of the first transmission data D_1 to the first terminal 200_1 based on the first reception sensitivity S_1, are determined (S124), and based on this, the modulated data MD is encoded and generated.

In this case, since the first reception sensitivity S_1 of the first terminal 200_1 and the second reception sensitivity S_2 of the second terminal 200_2 are not suitable to simultaneous transmission, the modulation unit 130 determines the modulation scheme and the analysis scheme that can transmit a part of the first transmission data D_1 to the first terminal 200_1 based on the first reception sensitivity S_1, and based on this, encodes and generates the modulation data MD.

Specifically, if the first reception sensitivity S_1 is between the first threshold value K1 and the second threshold value K2, the modulation unit 130 generates, for example, the modulated data MD encoded in the 16QAM method and the analysis scheme, and if the first reception sensitivity S_1 is equal to or higher than the second threshold value K2, the modulation unit 130 generates, for example, the modulated data MD encoded in the 64QAM method and the analysis scheme (see FIG. 5). The modulated data MD and the analysis scheme generated as above are transmitted to the first terminal 200_1 and are analyzed as a part of the first transmission data D_1.

On the contrary, if the first reception sensitivity S_1 is equal to or higher than the first threshold value K1 and the second reception sensitivity S_2 is equal to or higher than the second threshold value K2, the modulation unit 130 determines the modulation scheme and the analysis scheme that can transmit at least a part of the first transmission data D_1 to the first terminal 200_1 and transmit at least a part of the second transmission data D_2 to the second terminal 200_2 based on the first and second reception sensitivities S_1 and S_2 (S128), and encodes and generates the modulated data MD based on this.

Specifically, since the first reception sensitivity S_1 is equal to or lower than the first threshold value K1, the data may be provided to the first terminal 200_1 in the QPSK method. Further, since the second reception sensitivity S_2 is equal to or higher than the second threshold value K2, the data may be provided to the second terminal 200_2 in the 64QAM method. That is, the first terminal 200_1 can analyze which quarter of (0,0) to (1,1) corresponds to the received modulated data MD by determining in which quarter among quarters of an I-Q plane illustrated in FIG. 8 the received modulated data MD is located, and can analyze which point of (0,0,0,0,0,0) to (1,1,1,1,1,1) corresponds to the modulated data MD by determining which point among all points on the I-Q plane illustrated in FIG. 8 corresponds to the received modulated data MD.

In this embodiment, the modulation scheme may differ depending on the level of the first reception sensitivity S_1. Hereinafter, a case where the first reception sensitivity S_1 is lower than a third threshold value will be described (here, the third threshold value is smaller than the first threshold value K1).

When the first reception sensitivity S_1 is lower than the third threshold value, the modulation scheme is determined by the QPSK and a combination of the QPSK. That is, the modulation scheme is determined that can provide the data to the first terminal 200_1 in the QPSK method and provide the data to the second terminal 200_2 in the QPSK method.

The reason why the modulation unit 130 according to this embodiment uses such a modulation scheme in the case where the first reception sensitivity S_1 is lower than the third threshold value is as follows.

If the first reception sensitivity S_1 is lower than the third threshold value, the channel sensitivity is quite low, and careful attention is to be paid even if the data is provided to the first terminal 200_1 in the QPSK method. That is, in order to accurately transfer the data, a sufficient error margin is to be secured. In other words, in the case of selecting any one of points that belong to an area A on the I-Q plane illustrated in FIG. 8 and transmitting the data to the first terminal 200_1 in the QPSK method, there is a possibility that the data is unable to be properly transferred due to noise or the like that occurs in the data transmission process.

Accordingly, in this embodiment, if the first reception sensitivity S_1 is lower than the third threshold value, the data is transmitted to the first terminal 200_1 using only the points included in an area B to secure the reliability of the transmitted data. In the case of transmitting the data using only the points included in the area B of the I-Q plane, the data may be provided to the first terminal 200_1 in the QPSK method, and the data may also be provided to the second terminal 200_2 in the QPSK method (four points of the area B is available in each quarter).

Figure 9:
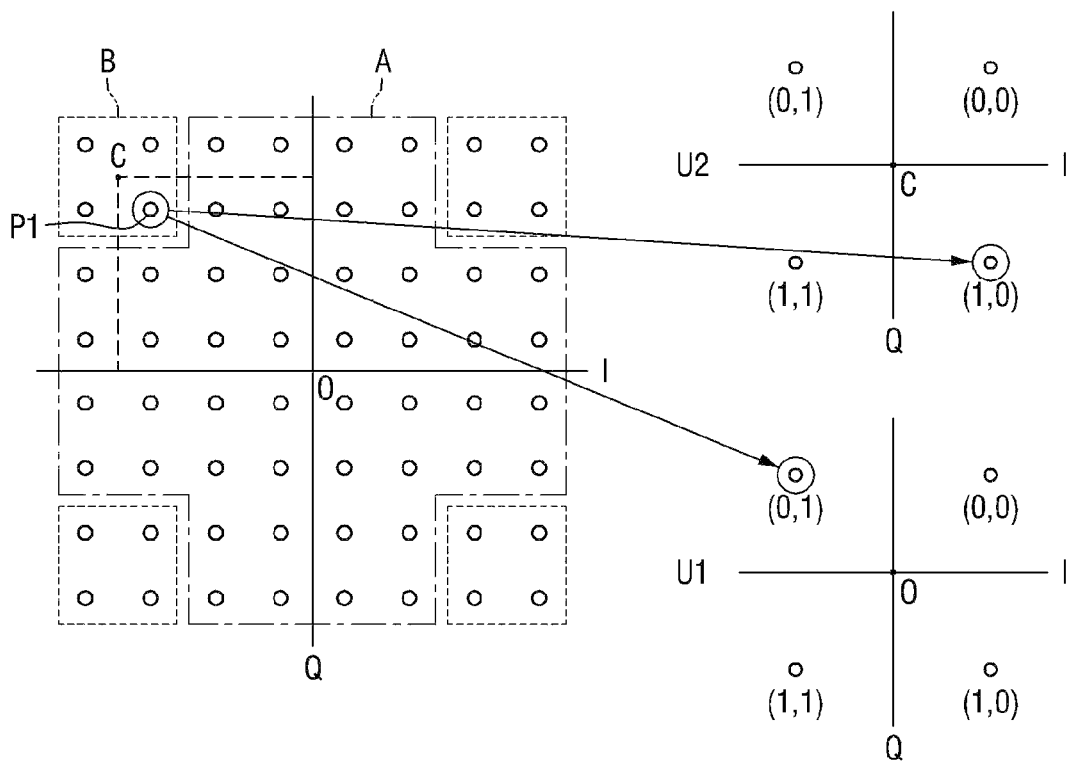

This will be described in more detail with reference to FIG. 9. First, the first transmission data D_1 to be provided to the first terminal 200_1 may be 0100110 . . . (see FIG. 6). Since only two-bit data can be transmitted in the QPSK method, (0,1) is to be transmitted to the first terminal 200_1. On the other hand, the second transmission data D_1 to be provided to the second terminal 200_2 may be 1011001 . . . (see FIG. 6). In the same manner, since only two-bit data can be transmitted in the QPSK method, (1,0) is to be transmitted to the second terminal 200_2.

Accordingly, the modulation unit 130 generates the modulated data MD by encoding a feature point (P1 in FIG. 9) on the I-Q plane where (0,1) can be provided to the first terminal 200_1 in the QPSK method and (1,0) can be provided to the second terminal 200_2 in the QPSK method. At this time, the first terminal 200_1 may analyze the modulated data MD as the same analysis reference point (for example, 0) as the modulation unit 130, but the analysis reference point of the I-Q plane in the second terminal 200_2 is to be changed, for example, to C. The modulation unit 130 also generates a second analysis scheme AS_2 that the second terminal 200_2 can analyze the provided modulated data MD in consideration of C as the reference point of the I-Q plane.

On the other hand, if the first reception sensitivity S_1 is equal to or higher than the third threshold value and equal to or lower than the first threshold value K1, the modulation scheme is determined by the QPSK and a combination of the 8QAM. That is, the modulation scheme is determined that can provide the data to the first terminal 200_1 in the QPSK method but provide the data to the second terminal 200_2 in the 8QAM method.

If the first reception sensitivity S_1 is equal to or higher than the third threshold value and equal to or lower than the first threshold value K1, the channel sensitivity is good in comparison to the case as described above. Accordingly, the error margin may be less considered in comparison to the above-described case.

Figure 10:
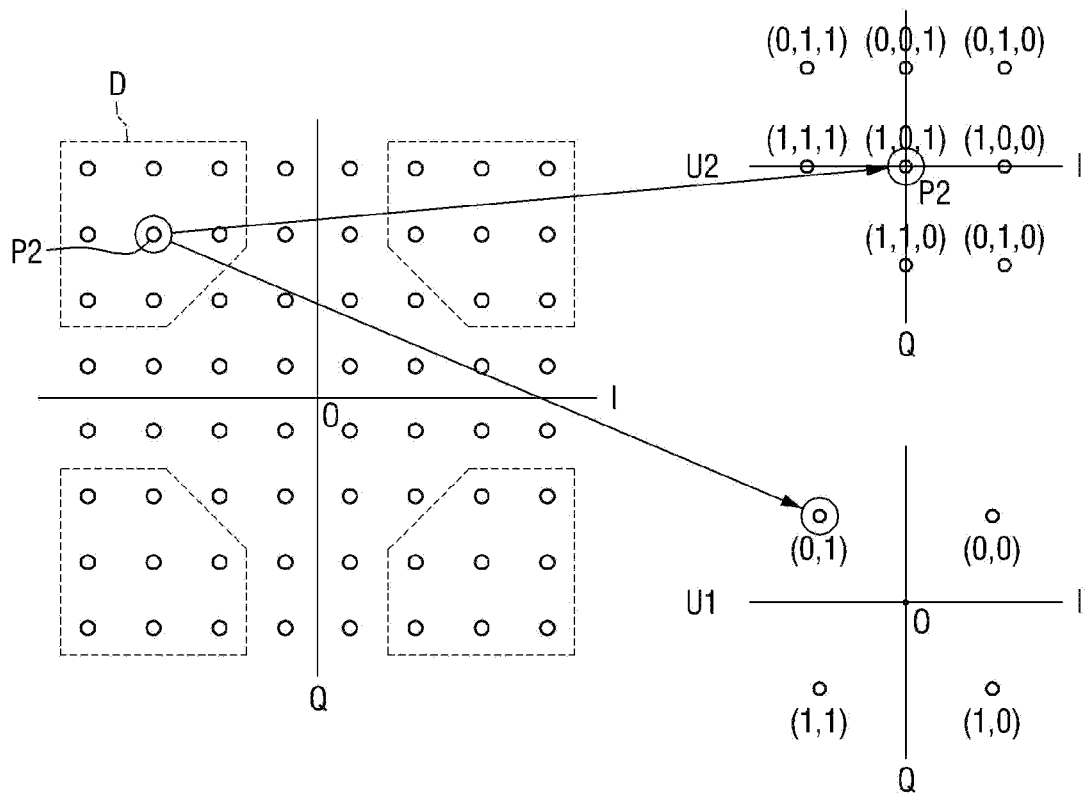

In this embodiment, if the first reception sensitivity S_1 is equal to or higher than the third threshold value and equal to or lower than the first threshold value K1, the data is transmitted to the first terminal 200_1 using the points included in an area D illustrated in FIG. 10. In the case of transmitting the data using the points included in the area D of the I-Q plane, the data is still provided to the first terminal 200_1 in the QPSK method, but the data may be provided to the second terminal 200_2 in the 8QAM method.

Although the data to be provided to the first terminal 200_1 is (0,1) as described above, three-bit data can be transmitted to the second terminal 200_2 in the 8QAM method, and thus (1,0,1) is to be transmitted to the second terminal 200_2.

Accordingly, the modulation unit 130 generates the modulated data MD by encoding a feature point (P2 in FIG. 10) on the I-Q plane where (0,1) can be provided to the first terminal 200_1 in the QPSK method and (1,0,1) can be provided to the second terminal 200_2 in the 8QAM method.

At this time, the first terminal 200_1 may analyze the modulated data MD as the same analysis reference point (for example, 0) as the modulation unit 130, but the analysis reference point of the I-Q plane in the second terminal 200_2 is to be changed, for example, to P2. The modulation unit 130 also generates the second analysis scheme AS_2 that the second terminal 200_2 can analyze the provided modulated data MD in consideration of P2 as the analysis reference point of the I-Q plane.

The operation of the modulation unit 130 as described above will be summarized as follow.

If the first reception sensitivity S_1 of the first terminal 200_1 is equal to or lower than the first threshold value K1 and the second reception sensitivity S_2 of the second terminal 200_2 is equal to or higher than the second threshold value K2, the modulation unit 130 determines the modulation scheme and the analysis scheme that can transmit the data simultaneously to the first terminal 200_1 and the second terminal 200_2, and based on this, generates one modulated data MD. Here, the modulated data MD may mean one symbol.

By contrast, If the first reception sensitivity S_1 of the first terminal 200_1 is not equal to or lower than the first threshold value K1 and the second reception sensitivity S_2 of the second terminal 200_2 is not equal to or higher than the second threshold value K2, the modulation unit 130 determines that the data is unable to be simultaneously provided to the first terminal 200_1 and the second terminal 200_2 as one modulated data MD, and generates the modulated data with the modulation scheme that the data can be provided to the first terminal 200_1 depending on the first reception sensitivity S_1. The modulated data MD that is generated at that time is unable to provide a part of the second transmission data D_2 to the second terminal 200_2.

If the modulation unit 130 determines that the data can be provided to the first terminal 200_1 and the second terminal 200_2 as one modulated data MD, the modulation unit 130 compares the first reception sensitivity S_1 of the first terminal 200_1 with the third threshold value (here, the third threshold value may be smaller than the first threshold value K1 previously compared).

If the first reception sensitivity S_1 is lower than the third threshold value as the result of the comparison, the modulation unit 130 determines the modulation scheme that can transmit the data to the first terminal 200_1 in the QPSK method and transmit the data to the second terminal 200_2 in the QPSK method. At this time, the points that belong to the area B on the I-Q plane illustrated in FIG. 9 may be used as the modulated data MD. At this time, in order for the second terminal 200_2 to analyze the modulated data MD as (1,0), the analysis reference point of the I-Q plane to be analyzed should be C. Accordingly, the modulation unit 130 also generates the second analysis scheme AS_2 that enables the modulated data MD to be analyzed as the I-Q plane where the analysis reference point is C.

If the first reception sensitivity S_1 is equal to or higher than the third threshold value as the result of the comparison, the modulation unit 130 determines the modulation scheme that can transmit the data to the first terminal 200_1 in the QPSK method and transmit the data to the second terminal 200_2 in the 8QAM method. At this time, the points that belong to the area D on the I-Q plane illustrated in FIG. 10 may be used as the modulated data MD. Even at this time, in order for the second terminal 200_2 to analyze the modulated data MD as (1,0,1), the analysis reference point of the I-Q plane to be analyzed should be P2. Accordingly, the modulation unit 130 also generates the second analysis scheme AS_2 that enables the modulated data MD to be analyzed as the I-Q plane where the analysis reference point is P2.

By providing one modulated data MD (for example, symbol) to the first terminal 200_1 and to the second terminal 200_2 according to the operation of the modulation unit 130, parts of the first and second transmission data D_1 and D_2 illustrated in FIG. 6 can simultaneously be provided to the first terminal 200_1 and the second terminal 200_2. If the data transmission is performed, the use efficiency of communication resources is heightened and high-speed communication becomes possible in comparison to the case where one modulated data MD is generated to transmit a part of the first transmission data D_1 to the first terminal 200_1 and separate modulated data MD is generated to transmit a part of the second transmission data D_2 to the second terminal 200_2.

Figure 11:
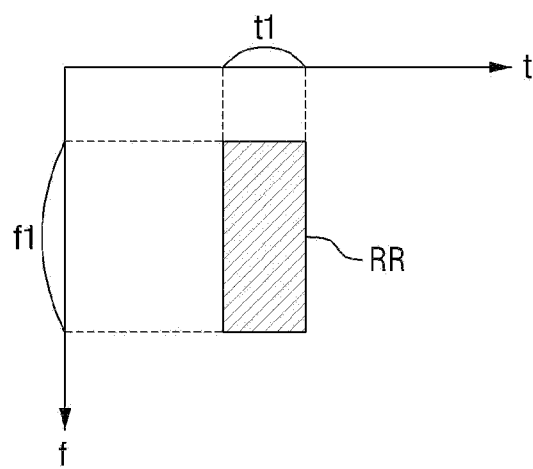

Referring again to FIG. 4, the encoded modulated data and the analysis schemes are transmitted (S140). Specifically, the resource allocation unit 140 may allocate the encoded modulated data MD and the analysis schemes AS_1 and AS_2 to a resource region RR that is determined with a predetermined time period f1 and a predetermined frequency period f1 as illustrated in FIG. 11, and transmit them to the first and second terminals 200_1 and 200_2.

In the example as described above, if the first reception sensitivity S_1 of the first terminal 200_1 is lower than the third threshold value, the resource allocation unit 140 may allocate the modulated data MD (P1 in FIG. 9), which is generated by the modulation unit 130 and can transmit the data to all the first terminal 200_1 and the second terminal 200_2 in the QPSK method, the first analysis scheme AS_1, and the second analysis scheme AS_2 to the resource region RR, transmit the modulated data MD (P1 in FIG. 9) and the first analysis scheme AS_1 to the first terminal 200_1, and transmit the modulated data MD (P1 in FIG. 9) and the second analysis scheme AS_2 to the second terminal 200_2.

The first terminal 200_1, which has received the modulated data MD (P1 in FIG. 9) and the first analysis scheme AS_1, can extract (0,1) by analyzing the modulated data MD (P1 in FIG. 9) in consideration of the analysis reference point of the I-Q plane as the original point depending on the first analysis scheme AS_1, and the second terminal 200_2, which has received the modulated data MD (P1 in FIG. 9) and the second analysis scheme AS_2, can extract (1,0) by analyzing the modulated data MD (P1 in FIG. 9) in consideration of the analysis reference point of the I-Q plane as C depending on the second analysis scheme AS_2.

Further, in the example as described above, if the first reception sensitivity S_1 of the first terminal 200_1 is equal to or higher than the third threshold value, the resource allocation unit 140 may allocate the modulated data MD (P2 in FIG. 10), which is generated by the modulation unit 130 and can transmit the data to the first terminal 200_1 in the QPSK method and transmit the data to the second terminal 200_2 in the 8QAM method, the first analysis scheme AS_1, and the second analysis scheme AS_2 to the resource region RR, transmit the modulated data MD (P2 in FIG. 10) and the first analysis scheme AS_1 to the first terminal 200_1, and transmit the modulated data MD (P2 in FIG. 10) and the second analysis scheme AS_2 to the second terminal 200_2.

The first terminal 200_1, which has received the modulated data MD (P2 in FIG. 10) and the first analysis scheme AS_1, can extract (0,1) by analyzing the modulated data MD (P2 in FIG. 10) in consideration of the analysis reference point of the I-Q plane as the original point depending on the first analysis scheme AS_1, and the second terminal 200_2, which has received the modulated data MD (P2 in FIG. 10) and the second analysis scheme AS_2, can extract (1,0,1) by analyzing the modulated data MD (P2 in FIG. 10) in consideration of the analysis reference point of the I-Q plane as P2 depending on the second analysis scheme AS_2.

The configuration of the system 1 for transmitting and receiving data according to this embodiment is not limited to the above-described examples. Hereinafter, referring to FIGS. 12 and 13, a device for transmitting data and a method for transmitting data according to another embodiment of the present inventive concept will be described.

Figure 12:
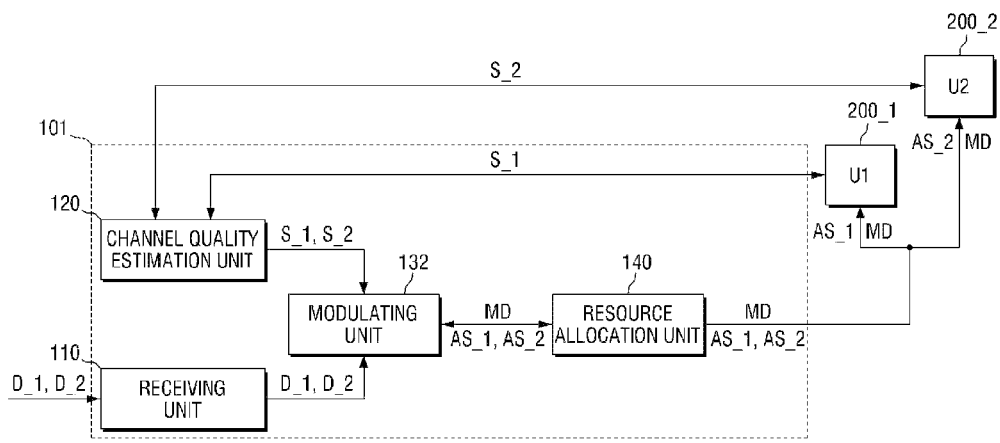
FIG. 12 is a computational block diagram of a device for transmitting data according to another embodiment of the present inventive concept.
Figure 13:
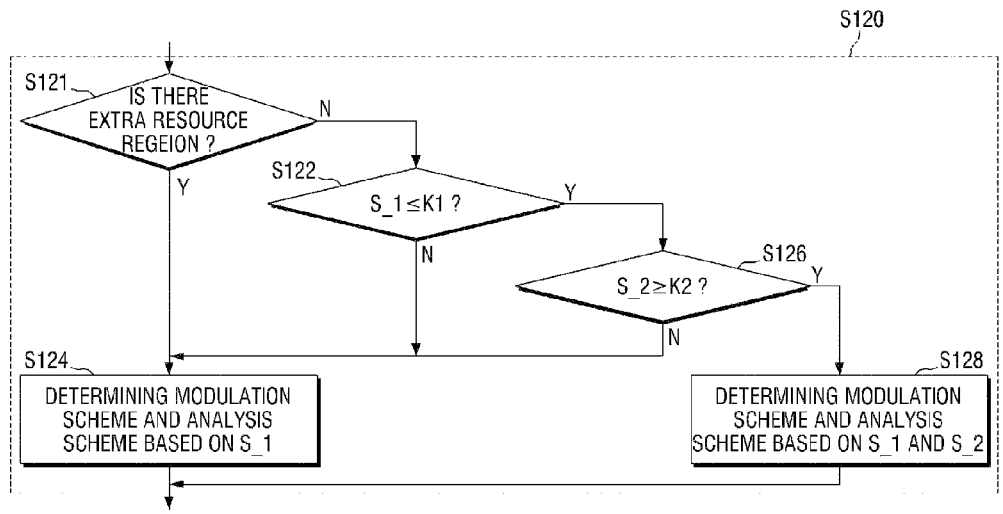
FIG. 13 is a flowchart illustrating a method for transmitting data according to another embodiment of the present inventive concept.

FIG. 12 is a conceptual block diagram of a device for transmitting data according to another embodiment of the present inventive concept, and FIG. 13 is a flowchart illustrating a method for transmitting data according to another embodiment of the present inventive concept.

Referring to FIG. 12, the device 101 for transmitting data includes a data receiving unit 110, a channel quality measurement unit 120, a modulating unit 132, and a resource allocation unit 140.

In this embodiment, other configurations except for the modulation unit 132 are the same as those according to the above-described embodiment, and duplicate description thereof will be omitted.

The modulation unit 132 according to this embodiment can generate the modulated data MD in consideration of whether there is any additional resource region RR (in FIG. 11) to which the modulated data MD is to be allocated. Hereinafter, referring to FIG. 13, this will be described in more detail.

Referring to FIG. 13, the modulation unit 130 may further perform determining whether there is any additional resource region RR (in FIG. 11) to which the modulated data MD is to be allocated (S 121) before comparing the first reception sensitivity S_1 with the first threshold value K1 (S 122).

If it is necessary that the modulation unit 130 compares the reception sensitivities of all the terminals 200_1 to 200_n as in the above-described embodiment in order to generate the modulated data (for example, P1 in FIG. 9 or P2 in FIG. 10) that can simultaneously transmit the transmission data to the first terminal 200_1 and the second terminal 200_2 for each frame, the operation load may be increased in processing a large amount of data in a short time. Accordingly, if the additional resource region RR (in FIG. 11) to which the modulated data MD is to be allocated is sufficient, it may be better in performance to separately generate and transmit modulated data MD that can transmit at least a part of the first transmission data D_1 to the first terminal 200_1 and modulated data MD that can transmit at least a part of the second transmission data D_2 to the second terminal 200_2.

Accordingly, in this embodiment, if the additional resource region RR (in FIG. 11) to which the modulated data MD is to be allocated is sufficiently provided, the modulation unit 130 determines the modulation scheme that can transmit at least a part of the first transmission data D_1 to the first terminal 200_1, and based on this, generates encoded modulated data MD (S124). That is, the modulation unit 130 separately generates the modulation data MD that can transmit at least a part of the first transmission data D_1 to the first terminal 200_1 and the modulated data MD that can transmit at least a part of the second transmission data D_2 to the second terminal 200_2, and separately transmits the modulated data to the first terminal 200_1 and the second terminal 200_2.

On the other hand, if the additional resource region RR (in FIG. 11) to which the modulated data MD is to be allocated is not sufficiently provided, the modulation unit 130 determines the modulation scheme that can transmit at least a part of the first transmission data D_1 to the first terminal 200_1 and transmit at least a part of the second transmission data D_2 to the second terminal 200_2 through the above-described operations S122, S126, and S128, and generates modulated data MD encoded depending on the determined modulation scheme. At this time, it is advantageous in efficiency to transmit data to many terminals 200_1 to 200_n with one modulation data MD (for example, symbol).

Since other aspects are the same as those in the above-described embodiment, a duplicate description thereof is here omitted to avoid redundancy.

On the other hand, the method for transmitting data according to the embodiments of the present inventive concept as described above can be implemented by a computer-readable code in a computer-readable recording medium. Here, the term computer-readable recording medium encompasses all kinds of recording devices in which data that can be read by a computer system is stored. Examples of the computer-readable recording medium include a ROM, a RAM, a CD-ROM, a magnetic tape, a floppy disc, and an optical data storage device, and further includes those implemented in the form of a carrier wave (for example, transmission through the Internet). Further, in the computer-readable recording medium, codes, which are distributed to a computer system connected to a network and can be read by a computer in a distribution method, can be stored and executed.

Next, referring to FIG. 14, an electronic system to which a device for receiving data according to embodiments of the present inventive concept may be applied and application examples thereof will be described.

Figure 14:
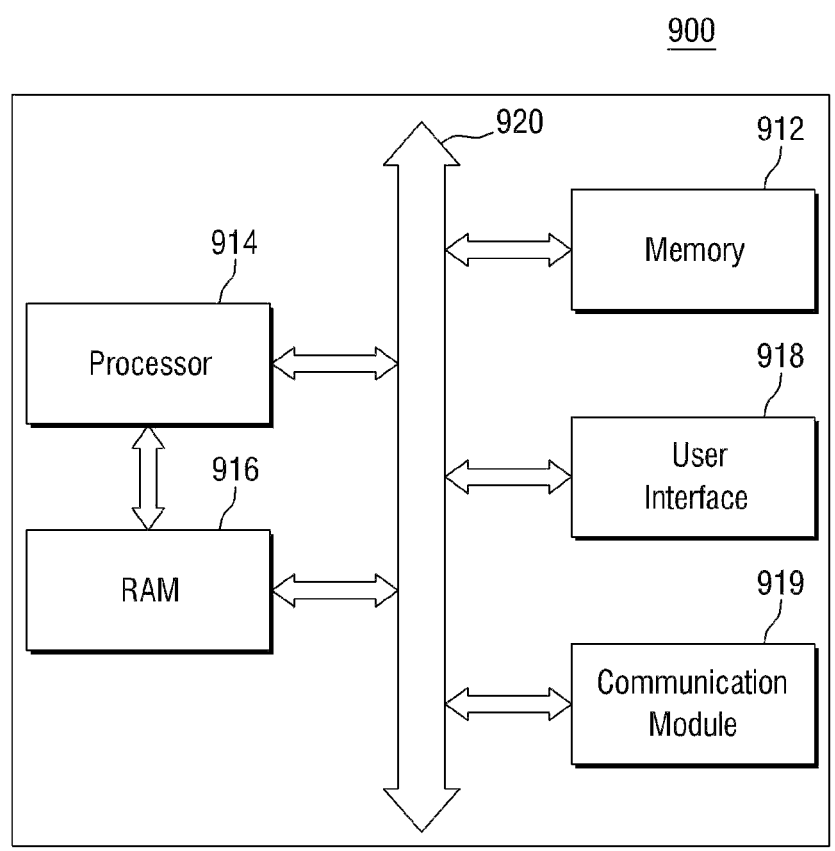
FIG. 14 is a block diagram illustrating an electronic system to which a device for receiving data according to embodiments of the present inventive concept is applied.

FIG. 14 is a block diagram illustrating an electronic system to which a device for receiving data according to embodiments of the present inventive concept is applied.

Referring to FIG. 14, the electronic system 900 of this example includes a memory system 912, a processor 914, a RAM 916, a user interface 918, and a communication module 919. These constituent elements communicate over a bus system 920.

The processor 914 may serve to execute a program and to control the electronic system 900. The RAM 916 may be used as an operating memory of the processor 914. In some embodiments of the present inventive concept, the processor 914 and the RAM 916 may be included in one package.

The user interface 918 may be used to input or output data to or from the electronic system 900.

The memory system 912 may store codes for the operation of the processor 914 and data processed by the processor 914 or data input from an external source. The memory system 912 may include a controller (not shown) and a memory device (not shown), where the controller is operatively connected between the bus 920 and the memory device. The controller may be configured to drive firmware for controlling the memory device, and may further include well known constituent elements (also not shown), such an internal processing unit, a host interface, and a memory interface.

An internal RAM of the controller may be used as an operating memory of the processing unit. The processing unit may control the overall operation of the controller. A host interface of the controller may operate according a data exchange protocol between the bus 920 and the controller. Exemplarily, the controller may be configured to communicate through at least one of various interface protocols, such as USB (Universal Serial BUS) protocol, MMC (Multimedia Card) protocol, PCI (Peripheral Component Interconnection) protocol, PCI_E (PCI-Express) protocol, ATA (Advanced Technology Attachment) protocol, Serial-ATA protocol, Parallel-ATA protocol, SCSI (Small Computer Small Interface) protocol, ESDI (Enhanced Small Disk Interface) protocol, and IDE (Integrated Drive Electronics) protocol. A memory interface of the controller may interface with the memory device of the memory 912. For example, the memory interface may include a NAND interface or a NOR interface.

The memory system 912 may be additionally configured to include an error correction unit. The error correction unit may be configured to detect and correct errors of data read from a memory device using an error correction code (ECC).

The controller and the memory device constituting the memory system 912 may be integrated into one semiconductor device. Exemplarily, the controller and the memory device may be integrated into one semiconductor device to configure a memory card. For example, the controller and the memory device may be integrated into one semiconductor device to configure a memory card, such as a PC card (PCMCIA, Personal Computer Memory Card International Association), compact flash memory (CF), smart media card (SM and SMC), memory stick, multimedia card (MMC, RS-MMC, MMCmicro), SD card (SD, miniSD, microSD, and SDHC), and universal flash storage device (UFS).

The memory system 912 may be packaged according to any of a variety of packaging technologies. For example, the memory system may be packaged in the form of PoP (Package on Package), Ball grid arrays (BGAs), Chip scale packages (CSPs), Plastic Leaded Chip Carrier (PLCC), Plastic Dual In Line Package (PDIP), Die in Waffle Pack, Die in Wafer Form, Chip On Board (COB), Ceramic Dual In Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

The communication module 919 may communicate with the memory system 912, the processor 914, the RAM 916, and the user interface 918, and the communication module 919 through the bus 920 as described above, and may include a device for receiving data (for example, FIG. 3) according to embodiments of the present inventive concept.

Figure 15:
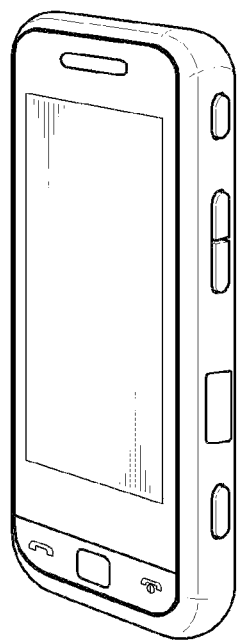
FIG. 15 is a perspective view of a mobile telephone to which the electronic system of FIG. 14 may be applied.

As described above, the electronic system 900 may be applied to electronic control devices of various electronic appliances. For example, FIG. 15 is a perspective view of a mobile telephone 1000 to which the electronic system 900 may be applied. In addition, the electronic system 900 may be applied to a mobile terminal having a mobile communication function, such as a portable notebook computer and a tablet PC.

Although preferred embodiments of the present inventive concept have been described for illustrative purposes, those skilled in the art will appreciate that various modifications, additions and substitutions are possible, without departing from the scope and spirit of the inventive concept as disclosed in the accompanying claims.

What is claimed is:

1. A device for transmitting data, comprising:
   a data receiving unit configured to receive first transmission data for a first terminal and second transmission data for a second terminal;
   a channel quality measurement unit configured to measure a first reception sensitivity of a channel connected to the first terminal and to measure a second reception sensitivity of a channel connected to the second terminal; and
   a modulating unit configured to determine a modulation scheme based on the first and second reception sensitivities, to encode the first transmission data and the second transmission data according to the determined modulation scheme to obtain modulated data, and to transmit the modulated data to the first and second terminals.

2. The device for transmitting data of claim 1, wherein the modulating unit transmits a first analysis scheme with the modulated data to the first terminal, wherein the first analysis scheme enables the modulated data to be analyzed by the first terminal; and
transmits a second analysis scheme with the modulated data to the second terminal, wherein the second analysis scheme enables the modulated data to be analyzed by the second terminal.

3. The device for transmitting data of claim 2, wherein at least one of the first and second analysis schemes is a scheme for analyzing the modulated data by moving an analysis reference point of an I-Q plane.

4. The device for transmitting data of claim 1, wherein, when the first reception sensitivity is equal to or lower than a first threshold value and the second reception sensitivity is equal to or higher than a second threshold value, the determining the modulation scheme based on the measured first and second reception sensitivities includes selecting any one of a first modulation scheme for modulating the first and second transmission data so that the modulated data provides data of the same number of bits to the first terminal and the second terminal, and a second modulation scheme for encoding the modulated data so that the modulated data provides the data of a different number of bits to the first terminal and the second terminal.

5. The device for transmitting data of claim 4, wherein the first modulation scheme includes QPSK (Quadrature Phase Shift Keying) and a combination of QPSK, and
the second modulation scheme includes QPSK and a combination of 8QAM (Quadrature Amplitude Modulation).

6. The device for transmitting data of claim 4, wherein when the first reception sensitivity is lower than a third threshold value and the second reception sensitivity is equal to or higher than the second threshold value, the first modulation scheme is selected, and
when the first reception sensitivity is equal to or higher than the third threshold value and the second reception sensitivity is equal to or higher than the second threshold value, the second modulation scheme is selected.

7. The device for transmitting data of claim 6, wherein the third threshold value is lower than the first threshold value and the first threshold value is lower than the second threshold value.

8. The device for transmitting data of claim 1, further comprising a resource allocation unit that allocates the modulated data to a predetermined time period and a predetermined frequency period.

9. The device for transmitting data of claim 1, wherein the data receiving unit, the channel quality measurement unit, and the modulating unit are arranged on a base station of a communication network.

10. The device for transmitting data of claim 9, wherein the communication network includes a wireless communication network.

11. The device for transmitting data of claim 1, wherein the modulated data is transmitted wirelessly to the first and second terminals, respectively.

12. A method for transmitting data, comprising:
measuring a first reception sensitivity of a channel connected to a first terminal from the first terminal;
measuring a second reception sensitivity of a channel connected to a second terminal from the second terminal;
receiving first and second transmission data to be transmitted to the first and second terminals;
determining a modulation scheme based on the first and second reception sensitivities;
encoding the first and second transmission data using the determined modulation scheme to obtain modulated data; and
transmitting the modulated data to the first and second terminals.

13. The method for transmitting data of claim 12, wherein the modulation scheme is determined based on a comparison result between the first reception sensitivity and first and third threshold values, and a comparison result between the second reception sensitivity and a second threshold value.

14. The method for transmitting data of claim 13, wherein the third threshold value is lower than the first threshold value and the first threshold value is lower than the second threshold value.

15. The method for transmitting data of claim 14, wherein the determining the modulation scheme includes:
selecting a first modulation scheme when the first reception sensitivity is lower than the third threshold value and the second reception sensitivity is equal to or higher than the second threshold value; and
selecting a second modulation scheme when the first reception sensitivity is between the third threshold value and the first threshold value and the second reception sensitivity is equal to or higher than the second threshold value.

16. The method for transmitting data of claim 15, wherein the first modulation scheme includes a modulation scheme for transmitting n-bit data of the first transmission data to the first terminal and simultaneously transmitting n-bit data of the second transmission data to the second terminal, and
the second modulation scheme includes a modulation scheme for transmitting the n-bit data of the first transmission data to the first terminal and simultaneously transmitting m-bit data of the second transmission data to the second terminal, where n and m are natural numbers and n≠m.

17. The method for transmitting data of claim 16, wherein n is smaller than m.

18. The method for transmitting data of claim 16, wherein the first modulation scheme includes QPSK and a combination of QPSK, and
the second modulation scheme includes QPSK and a combination of 8QAM.

19. The method for transmitting data of claim 12, further comprising allocating the modulated data to a predetermined time period and a predetermined frequency period,
wherein the determining the modulation scheme includes determining the modulation scheme in consideration of whether an extra resource region is present in the predetermined time period and the predetermined frequency period.

20. The method for transmitting data of claim 12, wherein the modulated data is transmitted wirelessly to the first and second terminals.

21. A system for transmitting and receiving data, comprising:
first and second terminals; and
a device for transmitting data configured to receive first transmission data for the first terminal and second transmission data for the second terminal, to determine a modulation scheme based on first and second reception sensitivities of the first and second terminals, respectively, to encode the first transmission data and the second transmission data according to the determined modulation scheme to obtain one modulated data, and to transmit the modulated data to the first and second terminals.

22. The system for transmitting and receiving data of claim 21, wherein the device for transmitting data transmits a first analysis scheme that enables the modulated data to be analyzed as the first transmission data at the first terminal, transmits a second analysis scheme that enables the modulated data to be analyzed as the second transmission data at the second terminal.

23. The system for transmitting and receiving data of claim 22, wherein at least one of the first and second analysis schemes is a scheme for analyzing the modulated data by moving an analysis reference point of an I-Q plane.

24. The system for transmitting and receiving data of claim 21, wherein the modulation scheme is determined based on a comparison result between the first reception sensitivity and first and third threshold values, and a comparison result between the second reception sensitivity and a second threshold value.

25. The system for transmitting and receiving data of claim 24, wherein the third threshold value is lower than the first threshold value and the first threshold value is lower than the second threshold value.

26. The system for transmitting and receiving data of claim 25, wherein the device for transmitting data encodes the modulated data according to a first modulation scheme when the first reception sensitivity is lower than a third threshold value that is lower than the first threshold value, and encodes the modulated data according to a second modulation scheme when the first reception sensitivity is equal to or higher than the third threshold value.

27. The system for transmitting and receiving data of claim 26, wherein the first modulation scheme is a scheme for encoding the modulated data so that the modulated data provides data of a same number of bits to the first terminal and the second terminal, and the second modulation scheme is a scheme for encoding the modulated data so that the modulated data provides the data of a different number of bits to the first terminal and the second terminal.

28. The device for transmitting data of claim 21, wherein the modulated data is transmitted wirelessly to the first and second terminals, respectively.

* * * * *